United States Patent [19]

Meyer et al.

[11] Patent Number: 4,539,117

[45] Date of Patent: Sep. 3, 1985

[54] METHOD FOR IMPROVING THE SEPARATING ACTION IN THE ULTRAFILTRATION OF AQUEOUS SOLUTIONS

[75] Inventors: Dieter Meyer, Düsseldorf; Christian Rossmann, Langenfeld; Friedbert Zetzsche, Düsseldorf, all of Fed. Rep. of Germany

[73] Assignee: Henkel Kommanditgesellschaft auf Aktien, Duesseldorf, Fed. Rep. of Germany

[21] Appl. No.: 288,928

[22] Filed: Jul. 31, 1981

[30] Foreign Application Priority Data

Dec. 13, 1980 [DE] Fed. Rep. of Germany ....... 3047122

[51] Int. Cl.$^3$ .............................................. B01D 13/00
[52] U.S. Cl. .................................... 210/639; 210/651
[58] Field of Search .............. 210/638, 639, 649, 650, 210/651; 585/818; 208/188; 252/340

[56] References Cited

U.S. PATENT DOCUMENTS 4,086,164 4/1978 Noda et al. ......................... 210/651

OTHER PUBLICATIONS

Lacey, Robert E. et al., Industrial Processing with Membranes, Wiley-Interscience, N.Y., 1972, p. 160.

*Primary Examiner*—David Sadowski
*Attorney, Agent, or Firm*—Ernest G. Szoke; Nelson Littell, Jr.; Henry E. Millson, Jr.

[57] ABSTRACT

A method for improving the separating action in the ultrafiltration of aqueous solutions containing high-molecular-weight organic compounds including water-soluble anionic and/or non-ionic surface-active compounds consisting essentially of subjecting an aqueous solution containing high-molecular-weight organic compounds including water-soluble anionic and/or non-ionic surface-active compounds to an ultrafiltration through a porous membrane in the presence of olefinically-unsaturated $C_{16-22}$ fatty acids or water-soluble salts thereof, in a weight ratio of surface-active compound to fatty acid or salt of from 20:1 to 1:1 and recovering said aqueous solution substantially separated from said high-molecular-weight organic compounds. The retention power for water-soluble tensides can be 0.9 or more with this measure (without the addition, $\leq 0.1$ to 0.5). Furthermore oil can be removed to a mineral oil content of 20 mg/l, whereas without the addition of the invention, values of more than 100 mg/l in the permeate are obtained.

5 Claims, No Drawings

METHOD FOR IMPROVING THE SEPARATING ACTION IN THE ULTRAFILTRATION OF AQUEOUS SOLUTIONS

BACKGROUND OF THE INVENTION

The subject of the invention is a method for improving the separating action in the ultrafiltration of aqueous solutions, particularly cleaning solutions, in order to be able to remove organic substances, like oils, fats, surface-active compounds or tensides and emulsifiers.

Ultrafiltration leads to the separation of high-molecular-weight organic substances, dispersed or dissolved in the aqueous phase, from low-molecular-weight substances. In this method, the aqueous phase is carried along an asymmetrical membrane or diaphragm under pressure. Water and the low-molecular-weight substances dissolved therein both inorganic and organic, pass through the membrane. The undissolved and dissolved high-molecular-weight organic substances accumulate in the retentate. A measure of the separating power of ultrafiltration membranes is the retention power R.

$$R = 1 - \frac{Cp}{Cr}$$

where $Cp$ = the concentrate in the permeate (portion passing through the membrane)

$Cr$ = the concentrate in the retentate (residue, portions not passing through the membrane)

The ultrafiltration method is frequently used for the treatment of waste water originating from used treatment solutions, for example, spent cleaning solutions and wash waters. Untrafiltration has also been suggested for the regeneration of degreasing solutions in metal cleaning.

Both organic and inorganic membranes or diaphragms with a retention power for molecules with a molecular-weight of between 2,000 and 40,000 can be used for the method. With a ultrafiltration it is possible to remove coarsely dispersed oils and tensides in the form of high-molecular-weight micells, as well as finely-divided solids, from the aqueous phase. Low-molecular-weight substances, particularly water-soluble salts, as they are present in the form of phosphates, silicates, caustic soda in cleaning solutions, but also water-soluble molecularly dissolved tensides and solubilized or very finely emulsified oils pass through the membrane and are found in the permeate. In sewage treatment, however, it is desirable to remove all organic substances as far as possible in order to keep the chemical oxygen demand (COD) in the sewage at a minimum.

The effectiveness of cleaning solutions is impaired not only by oils but also by certain surface-active substances, for example, petroleum sulfonates and anti-corrosives, which partially penetrate the membrane. In addition to the removal of oil, it is therefore of technical interest for the regeneration of cleaning solutions to remove all other organic substances as for as possible.

A particular problem exists in the treatment of so-called cold cleaning emulsions. Cold cleaning emulsions are mixtures of emulsifiers and solvents used to degrease metals. In their use, the contamination with the cold cleaning emulsion is rinsed off from large workpieces by means of water. Before these emulsions are introduced into the sewers, they must be freed of solvents and oils.

In the practical use of the ultrafiltration method for the regeneration of degreasing solutions and/or the treatment of contaminated waste water, the separating effect varied, depending on the degreasing agent and on the impurities in the aqueous solution.

For example, water-soluble, non-ionic tensides pass completely through the ultrafiltration membranes. Water-soluble, anionic-active tensides, are more or less retained, however, depending on the separating power of the membrane.

OBJECT OF THE INVENTION

An object of the present invention is to develop an improved method of ultrafiltration to remove anionic and/or particularly non-ionic tensides from aqueous cleaning solutions.

Another object of the present invention is to develop a method for improving the separating action in the ultrafiltration of aqueous solutions containing high-molecular-weight organic compounds including water-soluble anionic and/or non-ionic surface-active compounds consisting essentially of subjecting an aqueous solution containing high-molecular-weight organic compounds including water-soluble anionic and/or non-ionic surface-active compounds to an ultrafiltration through a porous membrane in the presence of olefinically unsaturated $C_{16-22}$ fatty acids or water-soluble salts thereof, in a weight ratio of surface-active compounds to fatty acid or salt of from 20:1 to 1:1 and recovering said aqueous solution substantially separated from said high-molecular-weight organic compounds.

These and other objects of the invention will become more apparent as the description thereof proceeds.

DESCRIPTION OF THE INVENTION

The method according to the invention is characterized in that unsaturated fatty acids with 16 to 22 carbon atoms and/or their soaps are added to the aqueous solutions, such as cleaning solutions containing anionic and/or particularly non-ionic tensides or emulsifiers prior to the ultrafiltration in such an amount that the weight ratio tensides to fatty acid or soap is 20:1 to 1:1.

More particularly, the present invention is directed to a method for improving the separating action in the ultrafiltration of aqueous solutions containing high-molecular-weight organic compounds including water-soluble anionic and/or non-ionic surface-active compounds consisting essentially of subjecting an aqueous solution containing high-molecular-weight organic compounds including water-soluble anionic and/or non-ionic surface-active compounds to an ultrafiltration through a porous membrane in the presence of olefinically unsaturated $C_{16-22}$ fatty acids or water-soluble salts thereof, in a weight ratio of surface-active compound to fatty acid or salt of from 20:1 to 1:1 and recovering said aqueous solution substantially separated from said high-molecular-weight organic compounds.

Surprisingly it was found that even water-soluble non-ionic and anionic tensides, solubilized and finely emulsified oils, as well as many anti-corrosives and oil and solvent emulsions prepared with them are almost completely retained in the retentate in ultrafiltration plants, if the method according to the invention is used.

If non-ionic tensides are primarily present in the cleaning solution, the weight ratio of tensides to fatty acid or salt is kept preferably between 8:1 to 1:1. Larger amounts of the unsaturated fatty acids and/or their soaps can be added prior to the ultrafiltration, but this brings practically no further improvement. Among the unsaturated fatty acids having from 16 to 22 carbon atoms and their soaps which can be used, are particularly the olefinically-unsaturated acids such as palmitoleic acid, ricinoleic acid, linoleic acid, linolenic acid, gadoleic acid, cetoleic acid and erucic acid. Of particular advantage is the use of oleic acid or its soaps.

The free fatty acids can be used, as far as they are soluble in alkaline cleaning solutions or solubilized or emulsified in tensides-containing or solvent-containing solutions. Instead of the free acids, their water-soluble or solubilizable soaps can also be used. Suitable as soaps of unsaturated fatty acids with 16 to 22 carbon atoms are, for example, the sodium, potassium, potassium and alkanolamine soaps. Calcium soaps can be used as solubilizable soaps. The manner in which they are added is not important.

When following the method according to the invention, the retention power for water-soluble anionic and non-ionic tensides is 0.9 or more. Without the addition of the unsaturated fatty acids and/or their soaps according to the invention, the retention power for water-soluble, non-ionic tensides is about 0.1 or less, that of anionic tensides about 0.5 or less. Furthermore a satisfactory removal of oil to a value of under 20 mg/l mineral oil content in the permeate is ensured by the method according to the invention. In very finely-divided emulsions or solubilized oils, the content of mineral oil in the permeate can be more than 100 mg/l without the addition according to the invention.

The following examples describe the method according to the invention within being limitative.

EXAMPLES

For ethylene oxide, the abbreviation "EO" is used. Formulations, like "coconut fatty alcohols+14 EO" means that this is an addition product of 14 mols of ethylene oxide onto 1 mol of a coconut fatty alcohol. The same holds true for the other ethylene oxide addition products.

Coconut fatty alcohol and coconut fatty amine are technical mixtures which are derived from coconut fatty acids which have substantially a carbon chain of $C_{12}$–$C_{18}$. All percentages are percent by weight.

EXAMPLE 1

A 0.4% aqueous solution of coconut fatty alcohol+14 EO was filtered at room temperature through a polyamide membrane with a pore width of 50 to 100 Å. The retention power was <0.1. With ultrafiltration after the addition of 0.05% sodium oleate, the retention power for the coconut fatty alcohol+14 EO was 0.94.

EXAMPLE 2

An aqueous solution consisting of 1.5% trisodium orthophosphate, 3.5% sodium carbonate, 0.2% coconut fatty alcohol+14 EO, passed through the ultrafiltration diaphragm with a retention power of <0.1. After the addition of 0.05% sodium oleate, a retention power of 0.95 was achieved for the non-ionic tenside and sodium oleate.

EXAMPLE 3

In the ultrafiltration of an aqueous emulsion consisting of 4.5% of a mineral oil fraction having a boiling point of 180° to 210° C., 0.2% nonylphenol+8 EO, and 0.15% oleyl alcohol+2 EO, a permeate with 1000 mg/l of mineral oil fraction was obtained. After the addition of 0.075% oleic acid, the permeate contained only 7 mg/l of mineral oil fraction.

EXAMPLE 4

An aqueous solution consisting of 1% sodium hydroxide, 2% sodium metasilicate, 0.5% sodium tripolyphosphate, 0.15% nonylphenol+14 EO, and 0.05% alkylbenzenesulfonate, passed through an inorganic ultrafiltration membrane with a retention power of 0.1. After the addition of 0.05% oleic acid, a retention-power of 0.9 was achieved for the anionic and non-ionic tensides.

EXAMPLE 5

An aqueous solution consisting of 0.8% coconut fatty amine+12 EO and 0.2% alkylbenzenesulfonate passed through an ultrafiltration membrane with a retention power of about 0.4. After the addition of 0.05% triethanolamine linoleate, a retention power of 0.95 was achieved for the tenside mixture.

EXAMPLE 6

An aqueous solution consisting of 0.4% coconut fatty alcohol+14 EO and 0.05% calcium ricinolate was separated with a retention power of 0.95, while the pure solution of coconut fatty alcohol+14 EO passed practically completely through the membrane.

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. A method for improving the separating action in the ultrafiltration of aqueous solutions containing water-soluble tensides selected from the group consisting of anionic, and non-ionic surface-active tensides, and mixtures thereof, and optionally other high-molecular-weight organic compounds consisting essentially of subjecting an aqueous solution containing water-soluble tensides selected from the group consisting of anionic, and non-ionic surface-active tensides, and mixtures thereof, and optionally other high-molecular-weight organic compounds to an ultrafiltration through a porous membrane in the presence of olefinically-unsaturated $C_{16-22}$-fatty acids or water-soluble salts thereof, in a weight ratio of said surface-active tensides to said fatty acid or salt of from 20:1 to 1:1, and recovering said aqueous solution substantially separated from said water-soluble tensides, and optionally other high-molecular-weight organic compounds.

2. The method of claim 1 wherein said aqueous solution contains predominately water-soluble non-ionic surface-active tensides and said olefinically-unsaturated fatty acids or water-soluble salts thereof are employed in a weight ratio of surface-active tenside to fatty acid or salt of from 8:1 to 1:1.

3. The method of claim 1 or 2 wherein said olefinically-unsaturated fatty acid or water-soluble salts thereof are oleic acid or its soaps.

4. The method of claim 1 or 2 wherein said porous membrane is inorganic or organic and has a retention power for molecules with a molecular-weight of between 2,000 and 40,000.

5. The method of claim 1 or 2 wherein a non-ionic surface-active tenside is always present in said aqueous solutions.

* * * * *